United States Patent [19]

Ono et al.

[11] Patent Number: 5,461,383
[45] Date of Patent: Oct. 24, 1995

[54] WIDEBAND MICROWAVE DETECTOR

[75] Inventors: Hisao Ono, Okazaki; Takeshi Hatasa, Toyota, both of Japan

[73] Assignee: Yupiteru Industries Co., Ltd., Tokyo, Japan

[21] Appl. No.: 276,473

[22] Filed: Jul. 18, 1994

[30] Foreign Application Priority Data

Jul. 19, 1993 [JP] Japan .................................. 5-178248

[51] Int. Cl.$^6$ .............................. G01S 7/40; H04B 17/00
[52] U.S. Cl. ............................ 342/20; 455/227; 455/315
[58] Field of Search ............................. 342/20; 455/227, 455/228, 315

[56] References Cited

U.S. PATENT DOCUMENTS

| | | |
|---|---|---|
| 4,313,216 | 1/1982 | Jaeger et al. . |
| 4,622,553 | 11/1986 | Baba et al. . |
| 4,630,054 | 12/1986 | Martinson . |
| 4,954,828 | 9/1990 | Orr . |
| 5,268,689 | 12/1993 | Ono et al. . |
| 5,305,007 | 4/1994 | Orr et al. ................................. 342/20 |
| 5,315,302 | 5/1994 | Katsukura et al. ...................... 342/20 |
| 5,389,930 | 2/1995 | Ono ........................................ 342/20 |

*Primary Examiner*—Stephen C. Bentley
*Assistant Examiner*—Theresa M. Wesson
*Attorney, Agent, or Firm*—Wenderoth, Lind & Ponack

[57] ABSTRACT

A wideband microwave detector includes: a first local oscillator outputting a first local oscillation output containing a basic wave component, a secondary high harmonic component and a tertiary high harmonic component and being swept within a predetermined frequency range; a first mixer performing frequency mixing of the first local oscillation output and an antenna input input through an antenna and outputting a first mixing output; a second local oscillator outputting a second local oscillation output; a second mixer performing frequency mixing of the first mixing output and the second local oscillation output for generating a second mixing output, a single frequency discriminator for detecting a specific frequency in a discrimination input, and mode selector switch alternately switching a single super heterodyne reception mode, in which the first mixing output of the first mixer is introduced into the frequency discriminator as the discrimination input and a double super heterodyne reception mode, in which the second mixing output of the second mixer is introduced into the frequency discriminator as the discrimination input, in synchronism with sweep operation of the first local oscillator.

14 Claims, 9 Drawing Sheets

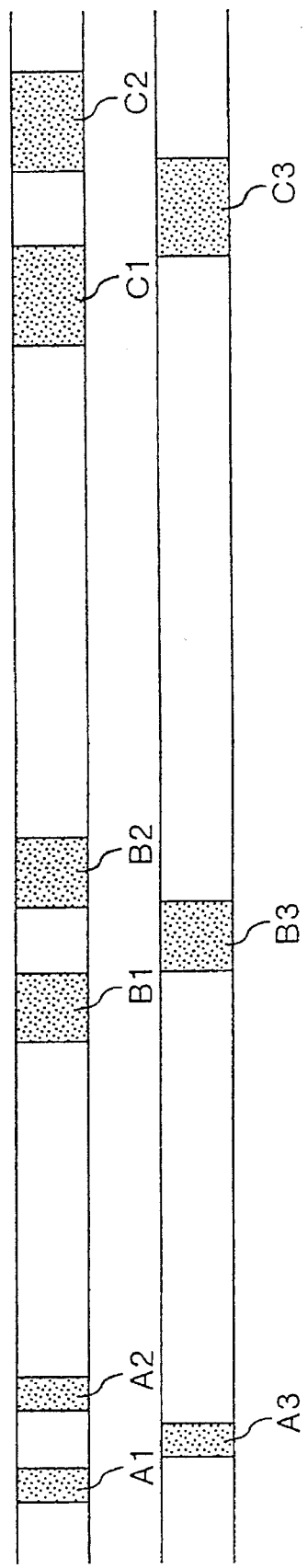

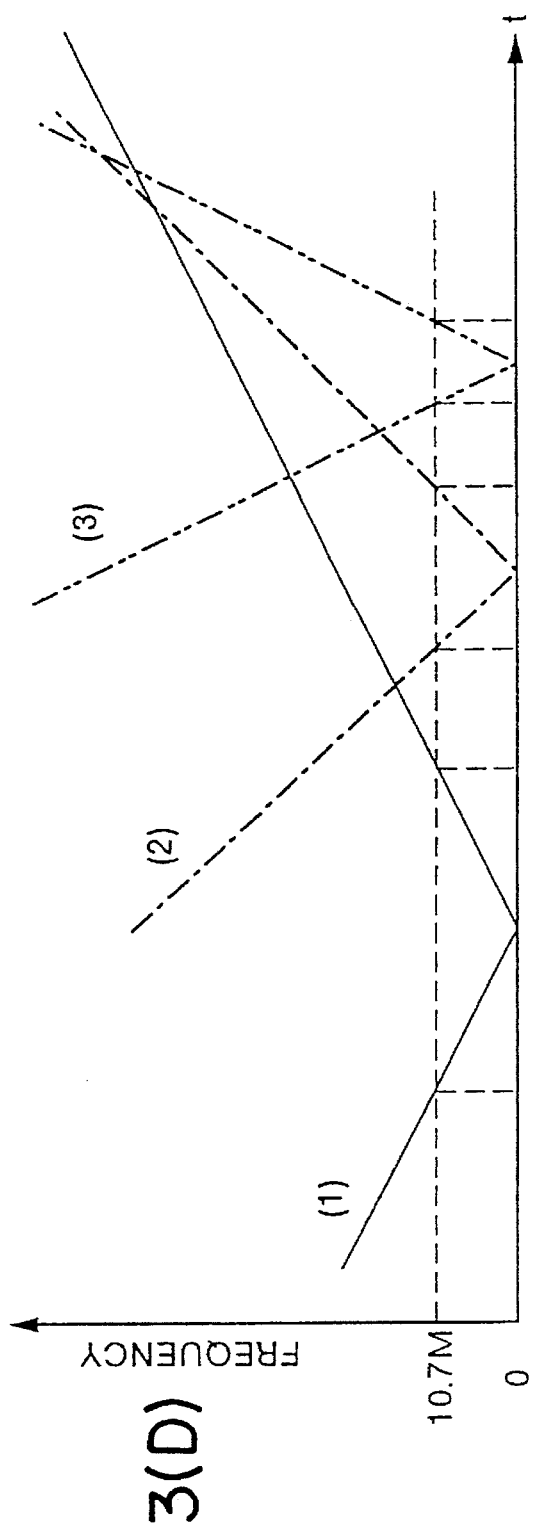
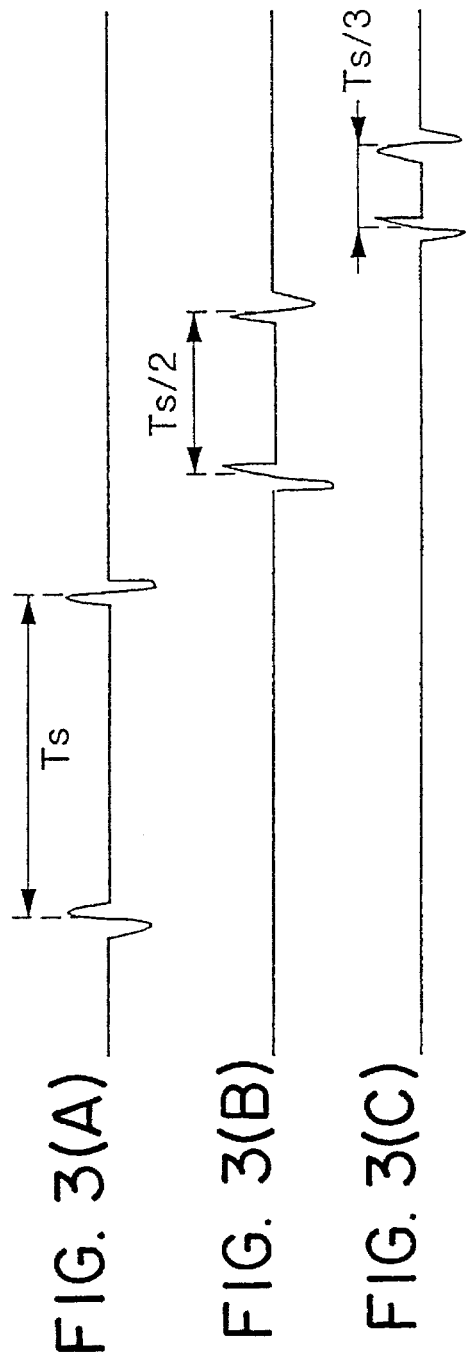
FIG. 3(A)
FIG. 3(B)
FIG. 3(C)
FIG. 3(D)

WIDEBAND MICROWAVE DETECTOR

BACKGROUND OF THE INVENTION

1. Field of the Invention

The present invention relates generally to a microwave detector for detecting microwaves transmitted from measuring equipment. More specifically, the invention relates to a wideband microwave detector which covers a wide frequency range with a single reception circuit.

2. Description of the Related Art

Multi-band microwave detectors, such as so-called radar detectors which are adapted to detect microwaves transmitted from radar type speed measurement equipment, have been known in the prior art. For example, U.S. Pat. No. 5,268,689 issued on Dec. 7, 1993 to Ono and Hatasa who are also the inventors of the present invention, U.S. Pat. No. 4,313,216, issued on Jan. 26, 1982 to Jaeger et al., U.S. Pat. No. 4,622,553, issued on Nov. 11, 1986 to Baba et al., U.S. Pat. No. 4,630,054, issued on Dec. 16, 1986 to Martinson, and U.S. Pat. No. 4,954,828, issued on Sep. 4, 1990 to Orr disclose radar detectors of the type that the present invention is directed. Typical traffic monitoring radar type speed measuring equipment (hereinafter referred to as "radar") employ microwaves in a plurality of frequency bands, i.e. 10 GHz band (X band), 24 GHz band (K band) and 35 GHz band (Ka band). The known radar detectors receive the microwaves transmitted from the radar through a heterodyne type receiver circuit, such as a super-heterodyne receiver circuit or so forth. For widening the receiving band range, a local oscillation frequency is swept.

In the microwave detector adapted to detect the traffic monitoring radar type speed measuring equipment, a target band range of detection in the X band is approximately 100 MHz and a target band range of the K band is approximately 200 MHz. Therefore, concerning the detection of X and K bands, the required bandwidth is relatively narrow. However, in the case of the Ka band, the target band range is 33.400 to 36.000 GHz (band width: 2.6 GHz), and thus is quite wide.

In the super-heterodyne receiver circuit, there are known microwave detectors capable of detecting X, K and Ka bands simultaneously by positively using not only a base frequency of the output of a first local oscillator but second and third high harmonics. However, in such known microwave detectors, only a part of the bandwidth, i.e. 2.6 GHz, of the Ka band can be covered.

In principle, it should be possible to cover the target band range for the detection of Ka band, i.e. 2.6 GHz, by providing a wider frequency sweeping width of the local oscillator. However, in such a case, the sweeping width which is required to fully cover the 2.6 GHz of the Ka band range, becomes approximately nine times of the target band width of the X band and K band. This means that an unnecessary band is swept, thereby spending an unnecessary period of time. Accordingly, the possibility of failure of detection of the target microwave in the X band and the K band is significantly increased.

SUMMARY OF THE INVENTION

In view of the problems in the prior art, it is an object of the present invention to provide a wideband microwave detector which can cover the entire target band ranges of X band, K band and Ka band with the simplest construction.

In order to accomplish the above-mentioned and other objects, a wideband microwave detector, according to one aspect of the invention, comprises:

a first local oscillator outputting a first local oscillation output containing a basic wave component, a secondary high harmonic component and a tertiary high harmonic component and being swept within a predetermined frequency range;

first mixing means for performing frequency mixing of the first local oscillation output and an antenna input input through an antenna and outputting a first mixing output;

a second local oscillator outputting a second local oscillation output;

second mixing means for performing frequency mixing of the first mixing output and the second local oscillation output for generating a second mixing output;

a single frequency discrimination means for detecting a specific frequency in a discrimination input;

and a mode switching means for alternately switching a single super heterodyne reception mode, in which the first mixing output of the first mixing means is fed into the frequency discrimination means as the discrimination input and a double super heterodyne reception mode, in which the second mixing output of the second mixing means is fed into the frequency discrimination means as the discrimination input, in synchronism with sweep operation of the first local oscillator.

In the preferred construction, the wideband microwave detector may further comprise signal processing means for distinguishing the output of the frequency discrimination means among the discrimination output obtained from a mixing signal of the basic wave component of the first local oscillation output and the antenna input, the discrimination output obtained from a mixing signal of the secondary high harmonic component and the antenna input and the discrimination output obtained from a mixing signal of the tertiary high harmonic component and the antenna input. Also, the wideband microwave detector may further comprise a switching control means for periodically varying sweep width of the first local oscillator.

According to another aspect of the invention, a wideband microwave detecting system for detecting a specific microwave involved in one of a plurality of mutually distinct predetermined band ranges comprises:

a first local oscillator generating a first local oscillation signal containing a plurality of mutually distinct frequency components including a basic wave component and at least one higher-order high harmonic component, the first oscillator sweeping within a predetermined frequency range;

a first mixer receiving an externally input signal and the first oscillation signal for mixing respective frequency components of the first oscillation signal with the externally input signal and outputting a first mixing signal having a peak at the center of respective of the predetermined band ranges;

a second local oscillator generating a second local oscillation signal;

a second mixer mixing the first mixing signal with the second local oscillation signal and outputting second mixing signal having two peaks in the vicinity of respective extreme frequencies of respective of predetermined band ranges;

signal path cyclically switching signal to pass between the first mixing signal and the second mixing signal;

a wave detector connected to the signal path to receive one of the first mixing signal and the second mixing signal as a detector input signal passing therethrough and detecting a predetermined specific frequency for generating a detecting pulse upon detection of the predetermined specific frequency in the detector input signal, and the predetermined frequency being set at a value so that the detector input signal varies across the predetermined specific frequency before and after reaching the peak; and discriminator receiving the detecting pulses and discriminating the band range of the externally input signal on the basis of an interval between the detecting pulses generated before and after the peak of the detector input signal.

According to a further aspect of the invention, a wideband microwave detecting system for detecting a specific microwave involved in one of X band, K band and Ka band comprises:

a first local oscillator generating a first local oscillation signal containing a plurality of mutually distinct frequency components including a basic wave component and at least one higher-order high harmonic component, the first oscillator sweeping within a predetermined frequency range;

a first mixer receiving an externally input signal and the first oscillation signal for mixing respective frequency components of the first oscillation signal with the externally input signal and outputting a first mixing signal having a peak at the center of respective of the predetermined band ranges;

a second local oscillator generating a second local oscillation signal;

a second mixer mixing the first mixing signal with the second local oscillation signal and outputting second mixing signal having two peaks in the vicinity of respective extreme frequencies of respective of predetermined band ranges;

signal path switching signal to pass between the first mixing signal and the second mixing signal according to a predetermined switching schedule;

a wave detector connected to the signal path to receive one of the first mixing signal and the second mixing signal as a detector input signal passing therethrough and detecting a predetermined specific frequency for generating a detecting pulse upon detection of the predetermined specific frequency in the detector input signal, and the predetermined frequency being set at a value so that the detector input signal varies across the predetermined specific frequency before and after reaching the peak; and discriminator receiving the detecting pulses and discriminating the band range of the externally input signal on the basis of an interval between the detecting pulses generated before and after the peak of the detector input signal.

Preferably, the system further comprises a means for converting the period of the interval of the detecting pulses into a voltage. Also, the system may further comprise a periodic switch periodically switched between a first position for passing the first mixing signal through the signal path and a second position for passing the second mixing signal through the signal path. In this case, the system is preferred to further comprise a saw-tooth signal generator generating a saw-tooth signal having a saw-tooth wave period corresponding to the switching cycle of periodic switch. Then, the system may further comprise means for converting the period of the interval of the detecting pulses into a voltage on the basis of the voltage level difference of the saw-tooth signal at the occurrence of a leading detecting pulse generated upon detection of the predetermined specific frequency before the detector input signal reaches the peak and at the occurrence of a trailing detecting pulse generated upon detection of the predetermined specific frequency after the detector input signal reaches the peak.

In the alternative, the system may be designed to be operable in mutually distinct first, second and third modes.

In the first mode, the first local oscillator is set a sweeping frequency range at a predetermined wider range, the signal path passes the second mixing signal, and the wave detector is adapted to detect the predetermined specific frequency in the vicinity of one of extremes of the Ka band.

In the second mode, the first local oscillator is set the sweeping frequency range at a predetermined narrower range, the signal path passes the second mixing signal, and the wave detector is adapted to detect the predetermined specific frequency in the vicinity of one of extremes of the X and K bands.

In the third mode, the first local oscillator is set the sweeping frequency range at the predetermined wider range, the signal path passes the first mixing signal and the wave detector is adapted to detect the predetermined specific frequency in the vicinity of center frequency of the Ka band.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the invention, but are explanation and understanding only.

In the drawings:

FIG. 2 is an illustration showing a reception sensitivity distribution in the first embodiment of the microwave detector of FIG. 1;

FIGS. 3(A)–3(D) show the detecting operation in the first embodiment of the microwave detector of FIG. 1;

DESCRIPTION OF THE PREFERRED EMBODIMENT

In the following description, numerous specific details are set forth in order to provide a thorough understanding of the present invention. It will be obvious, however, to those skilled in the art that the present invention may be practiced without these specific details. In other instances, well-known structures are not shown in detail in order not to unnecessary obscure the present invention.

Figure 1:
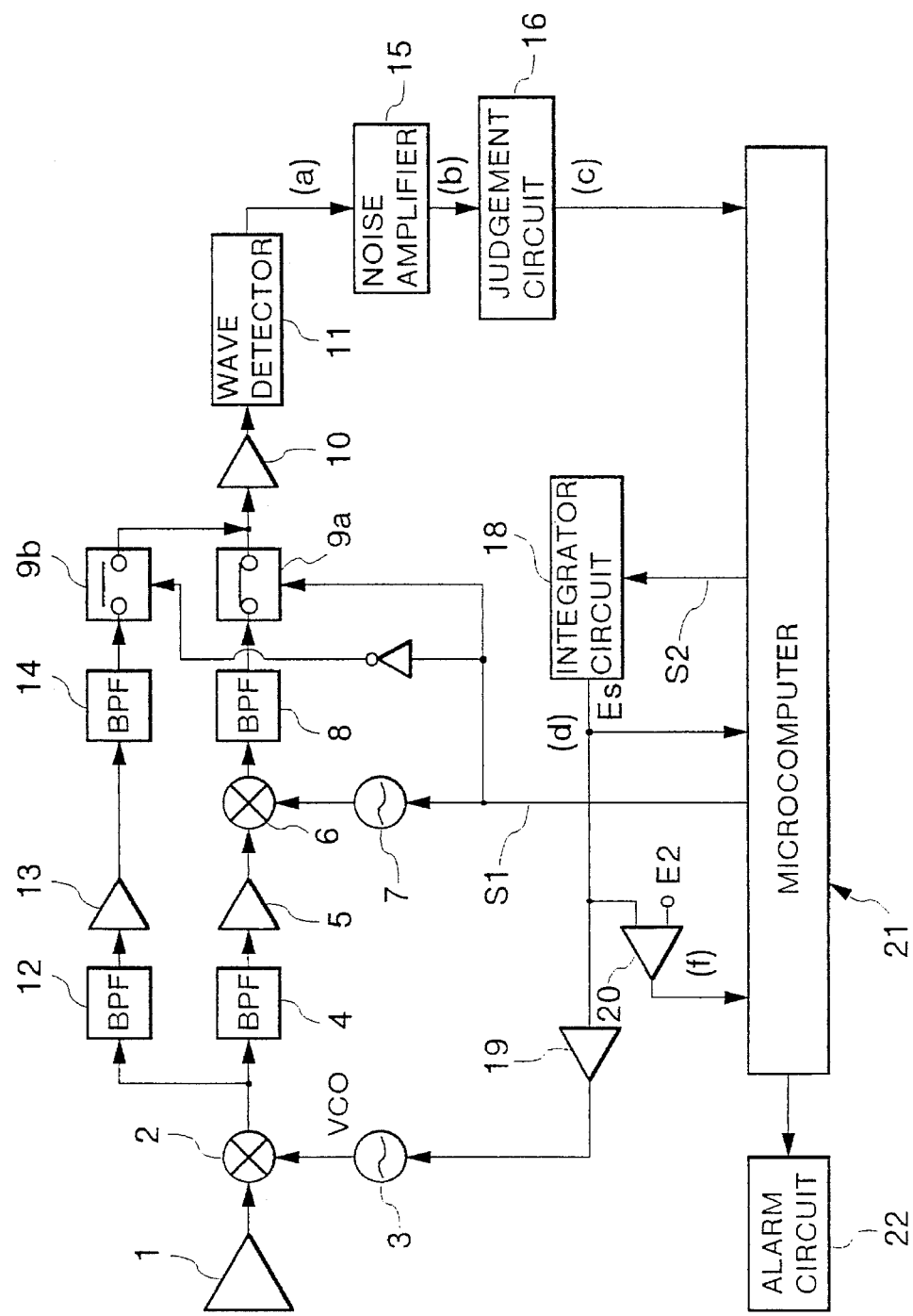
FIG. 1 is a schematic block diagram showing the first embodiment of a microwave detector according to the present invention.

Referring now to FIG. 1, there is illustrated the first embodiment of a wideband microwave detector according to the present invention. The construction of the first embodiment of the microwave detector will be given hereinafter in terms of a double super-heterodyne receiving system. In FIG. 1, an externally transmitted microwave signal is received by a horn antenna 1 and fed to a first mixer 2. The first mixer 2 is also connected to a first local oscillator 3. The first mixer 2 performs frequency mixing of the microwave and a local oscillation output of the first local oscillator 3. The first local oscillator 3 comprises a voltage controlled variable frequency oscillator (VCO) and is adapted to be repeatedly swept within a predetermined frequency range. On the other hand, the first local oscillation output of the first local oscillator 3 positively contains not only a base wave of a base frequency but also a secondary high harmonic which has a frequency double of the base frequency and a tertiary high harmonic which has a frequency three times of the base frequency. The first mixer 2 outputs a first mixing output as a result of frequency mixing of the received microwave and the first local oscillation output.

The first mixing output of the first mixer 2 is input to a second mixer 6 via a band-pass filter 4 and a first intermediate frequency (IF) amplifier 5. The second mixer 6 is also connected to a second local oscillator 7. The second mixer 6 performs frequency mixing of the first mixing output and the second local oscillation output of the second local oscillator 7 to output a second mixing output. The second mixing output of the second mixer 6 is input to a wave detector 11 via a band-pass filter 8, an analog switch 9a and a second intermediate frequency (IF) amplifier 10.

The analog switch 9a is coupled with another analog switch 9b for alternately switched into ON and OFF state in complementary manner by a switching signal S1 from a microcomputer 21 as discussed later. At the analog switch position where the switch 9a is ON and the switch 9b is OFF, a double super-heterodyne receiving mode is active. On the other hand, at the analog switch position where the switch 9b is ON and the switch 9a is OFF, a single super-heterodyne receiving mode is active.

In the single super-heterodyne receiving mode, the second local oscillator 7 terminates oscillation. Therefore, the first mixing output from the first mixer 2 is input to the wave detector 11 via the band-pass filter 12, the first intermediate frequency amplifier 13, the band-pass filter 14, the switch 9b and the second intermediate frequency amplifier 10.

The wave detector 11 detects a signal of 10.7 MHz. The oscillation frequency of the second local oscillator 7 is 900 MHz, in which only the base frequency is positively used. On the other hand, the first local oscillator 3 comprising the VCO has a center frequency of the output at 11.567 GHz and a sweep width of 300 MHz. The output frequency of the first local oscillator 3 is in a range of 11.417 to 11.717 GHz and swept repeatedly. As set forth above, with respect to the first local oscillator 3, not only the base wave but also the secondary and tertiary high harmonics are positively used in the manner set out below.

In the basic operation of the shown embodiment, the switch signal S1 is reversed per sweep period in synchronism with sweeping operation of the first local oscillator 3. Therefore, the double super-heterodyne receiving mode and the single super-heterodyne receiving mode are repeated alternately.

Since the frequencies of respective parts of the shown embodiment are set as set forth above, two sensitive bands A1 and A2 in the X band is established by the mixing output of the input signal (microwave) and the base wave of the first local oscillator 3, in the double super-heterodyne receiving mode, as shown in FIG. 2. Also, in the double super-heterodyne receiving mode, with the mixing output of the input signal and the secondary high harmonic of the first local oscillator 3, two sensitive bands B1 and B2 are established in the K band. In the double super-heterodyne receiving mode, two further sensitive bands C1 and C2 in the Ka band are established by the mixing output of the input signal and the tertiary high harmonic of the first local oscillator 3. On the other hand, in the single super-heterodyne receiving mode, a sensitive band A3 which is intermediate between the sensitive bands A1 and A2 in the X band is established by the mixing output of the base wave of the first local oscillator 3 and the input signal; a sensitive band B3 which is intermediate between the sensitive bands B1 and B2 in the K band is established by the mixing output of the secondary high harmonic of the first local oscillator 3 and the input signal; and a sensitive band C3 which is intermediate between the sensitive bands C1 and C2 in the Ka band is established by the tertiary high harmonic of the first local oscillator 3 and the input signal, as shown in FIG. 2. The concrete frequencies of respective sensitive bands are as follows:

A1 10.5063 GHz~10.8277 GHz
A2 12.3063 GHz~12.6277 GHz
A3 11.4063 GHz~11.7277 GHz
B1 21.9233 GHz~22.5447 GHz
B2 23.7233 GHz~24.3477 GHz
B3 22.8233 GHz~23.4447 GHz
C1 33.3403 GHz~34.2617 GHz
C2 35.1403 GHz~36.0617 GHz
C3 34.2403 GHz~35.1617 GHz

In case of the microwave detector adapted for detecting the traffic monitoring radar type speed measuring equipment, the target band range for detection of the X band is completely included in the sensitive band A1. Also, the target band range for detection of the K band is completely included in the sensitive band B2. The target band range of the Ka band extends overall sensitive ranges C1, C2 and C3. As can be appreciated, the deadband between the sensitive ranges C1 and C2 in the double super-heterodyne receiving mode, can be covered by the sensitive band C3 in the single super-heterodyne receiving mode. Therefore, in combination of these two receiving modes, satisfactorily wide detection band for the Ka band microwave can be established.

It should be particularly attracted the attention to the fact that the sweep width of the first local oscillator 3 is 300 MHz which is not excessively large, and not only the X band and K band, but also the Ka band which has wide band range can be completely covered by alternating the double super-heterodyne receiving mode and the single-heterodyne receiving mode. Also, since the single super-heterodyne receiver circuit can be established by bypassing the second mixing stage in the double super-heterodyne receiver circuit, the circuit will not become particularly complicated.

FIGS. 3(A)–3(D) shows the relationship between the variation of the input frequency and a detection signal (A). In FIG. 3(D), the solid line (1) represents a frequency variation of a mixing signal of the base wave of the first local oscillator 3 and the input signal, the one-dotted line (2) represents a frequency variation of a mixing signal of the secondary high harmonic and the input signal, and the two-dotted line (3) represents a frequency variation of a mixing signal of the tertiary high harmonic and the input signal. When the input signal included in the above-mentioned sensitive band is present, the input frequency of the wave detector 11 becomes zero after varying across 10.7 MHz and again varies across 10.7 MHz, the wave detector 11 outputs a pair of pulse waves which are symmetric about the point, at which the frequency becomes zero, on the time axis, as a detection signal (A). When the sweeping speed of the first local oscillator 3 is constant, and assuming that the variation rate of the frequency of the mixing signal (1) on the basis of the base wave is Vf, the variation rate of the mixing signal (2) based on the secondary high harmonic of the first local oscillator 3 becomes double of Vf (2Vf), and the variation rate of the mixing signal (3) based on the tertiary high harmonic of the first local oscillator becomes three times of Vf (3Vf). Accordingly, assuming a period of the pulse of the detection signal detected from the mixing signal (1) is Ts, the pulse period of the detection signal detected from the mixing signal (2) becomes one half of Ts, and, similarly, the pulse period of the detection signal detected from the mixing signal (3) becomes one third of Ts. Based on this, the input signal causing the frequency variation can be discriminated between the X band, the K band and the Ka band as will be discussed later.

Figure 4A:
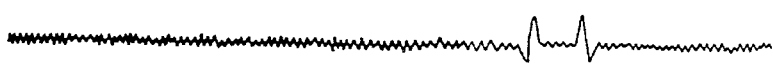
FIGS. 4(a)–4(S1) show waveforms at major parts of the first embodiment of the microwave detector of FIG. 1.
Figure 4B:
Figure 4C:
Figure 4D:
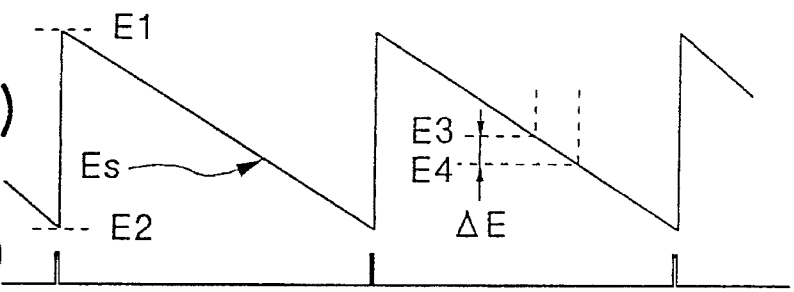
Figure 4F:

A processing system, a sweep control system and a receiving mode switching control system for the output (a) of the wave detector 11 in the microwave detector illustrated in FIG. 1 will be discussed hereinafter in detail with reference to FIGS. 4(a)–4(S1).

The output (a) of the wave detector 11 is amplified by a noise amplifier 15. The gain of the noise amplifier 15 is set at quite large so that the amplifier output (b) fully swings between positive and negative in response to the white noise while no detection output (a) is present and a high density rectangular wave train at the frequency of the white noise is output, as shown in FIGS. 4(a)–4(S1). When a pair of above-mentioned detection signals are input to the noise amplifier 15, the width of the rectangular wave of the output (b) of the noise amplifier 15 becomes wider in the extent to be clearly distinguished from that in the no detection signal state.

A judgement circuit 16 is a circuit for detecting generation of a positive pulse higher than or equal to ΔT in the output (b) of the noise amplifier 15. As shown in FIGS. 4(a)–4(S1), when the detection signal consisting of a pair of pulses is generated at the output (a) of the wave detector 11, a pair of pulse signals corresponding to the detection signal is generated at the output (c) of the judgement circuit 16. The pulse signals output from the judgement circuit 16 serves as a reception judgement signal indicative of inputting of the predetermined band of the microwave. This reception judgement signal (c) is input to the microcomputer 21 for predetermined confirmation process discussed later. When the microcomputer 21 confirms that the cause of the judgement signal (c) is input of the targeted microwave, an alarm circuit 22 is actuated. It should be noted that the microcomputer 21 also performs discrimination of the band (X band, K band or Ka band) of the input signal, simultaneously with the foregoing process. The operation pattern of the alarm circuit 22 may be differentiated depending upon the discriminated band.

An integrator circuit 18 is a circuit for generating a sweep control signal (d) for the first local oscillator 3 comprising VCO. The integrator circuit 18 is reset in response to a reset signal S2 from the microcomputer 21. Then, the output voltage ES of the integrator circuit 18 is set at the maximum initial voltage E1. Subsequently, the integrator circuit 18 performs integrating operation to lower the output voltage Es at a given constant rate.

On the other hand, the output voltage Es of the integrator circuit is compared with a final voltage E2 by a comparator 20. When the output voltage Es is lowered to E2, the comparator 20 outputs a sweep end signal (f). The microcomputer 21 is responsive to the sweep end signal (f) from the comparator 20 to output the reset signal S2 for resetting the integrator circuit 18. By this the system state is returned to the initial condition and the foregoing operation is repeated. The output (d) of the integrator circuit 18 is appropriately amplified by an amplifier 19 to be the sweep control signal for the first local oscillator 3.

As can be clear from the discussion given hereabove, the output voltage Es of the integrator circuit 18 is becomes a saw-tooth wave lowering the level from E1 to E2 at substantially constant rate. This variation of the voltage corresponds to variation of the frequency (sweep) of the first local oscillator 3. Then, the microcomputer 21 reverses the switching signal S1 for alternately switching the double super heterodyne receiving mode and the single super heterodyne receiving mode, at every occurrence of renewing of the sweep cycle by resetting the integrator circuit 18.

Here, as discussed with respect to FIGS. 3(A)–3(D), upon input of the objective microwave, a pair of pulses are generated with a predetermined interval at the output (a) of the wave detector 11. As shown in FIGS. 4(a)–4(S1), it is assumed that the output voltage of the integrator circuit 18 at the occurrence of the first detection pulse is E3, the output voltage of the integrator circuit 18 at the subsequent occurrence of the second detection pulse is E4, and the difference between the output voltages E3 and E4 is ΔE.

On the other hand, as shown in FIGS. 3(A)–3(D), the internal of a pair of detection pulses is significantly differentiated at the input of X band, K band and Ka band. Since this difference of the pulse interval corresponds to the voltage difference ΔE, it becomes possible to discriminate the input signal through an antenna between the X band, K band and Ka band by measuring the voltage difference ΔE and discriminating the level thereof. The microcomputer 21 thus processes the output of the integrator circuit 18 for distinguishing the band of the reception signal.

Figure 5:
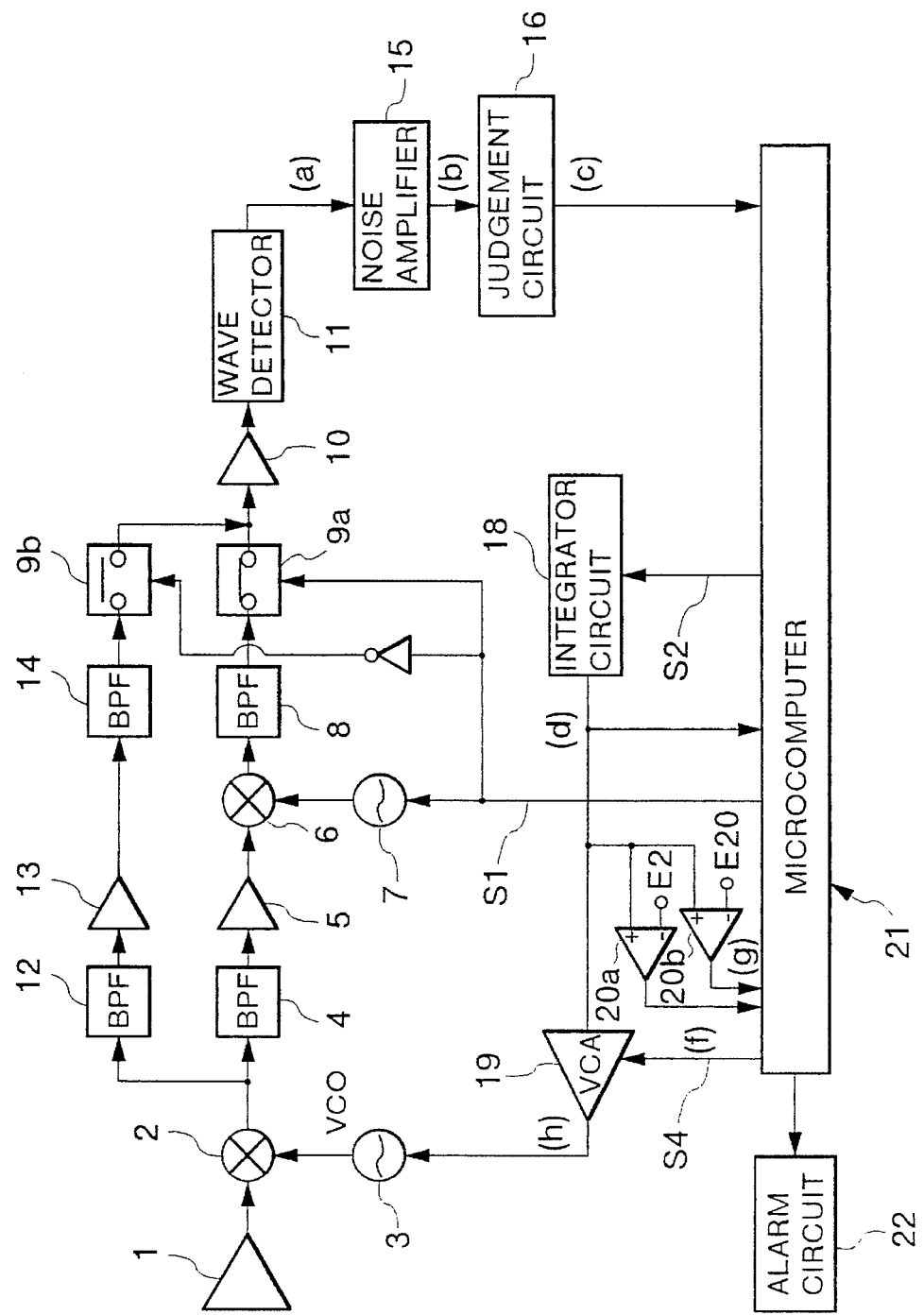
FIG. 5 is a schematic block diagram showing the second embodiment of a microwave detector according to the present invention.
Figure 6:
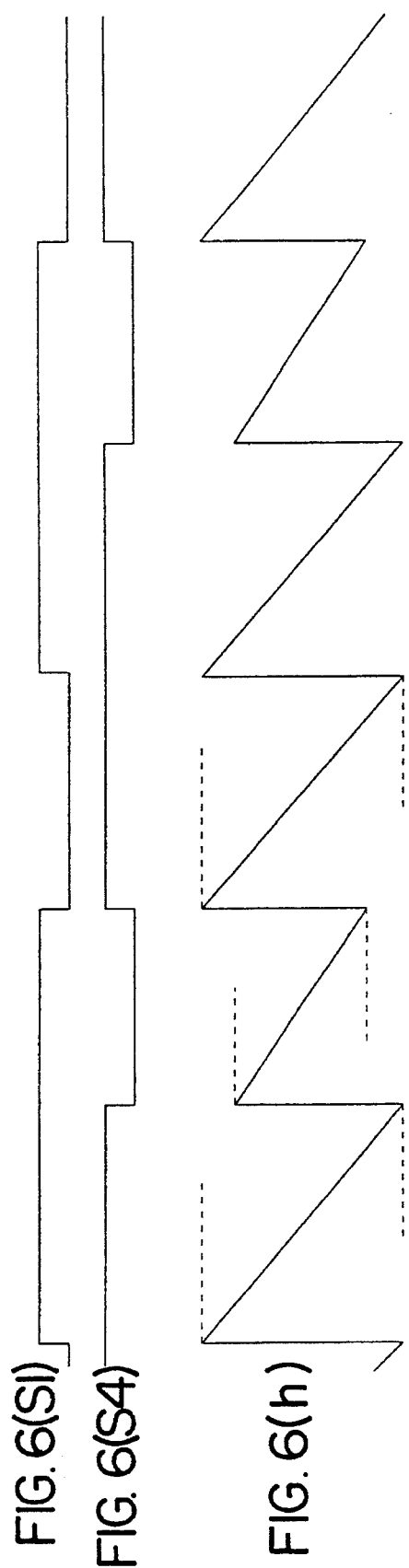
FIGS. 6(S1), 6(S4), and 6(h) show waveforms at major parts of the second embodiment of the microwave detector of FIG. 5.

Next, the second embodiment of the microwave detector according to the present invention will be discussed with reference to FIGS. 5 and 6(S1), 6(S4), and 6(h).

In the second embodiment, the switching cycle between the double super heterodyne reception mode and the single super heterodyne reception mode is set to repeat the double super heterodyne reception mode in two sequential cycles and then the single super heterodyne reception mode is performed in the subsequent cycle. The first cycle of the twice repeated double super heterodyne reception mode is performed with a sweep width the same as that in the single super heterodyne reception mode, and the second cycle of the double super heterodyne reception mode is performed with a sweep width appropriately smaller than the first cycle.

In order to vary the sweep width in two stages, a method for switching a gain of the amplifier 19 for the sweep control signal is employed. In this method, the microcomputer 21 outputs a gain control signal S4 to control the gain of the amplifier 19. Also, in order to vary a sweep termination frequency, a comparator 20b for comparing the output voltage Es of the integrator circuit 18 with a reference voltage E20 which is different from the reference voltage E2 is provided in addition to a comparator 20a which compares the output signal Es of the integrator circuit 18 with the reference voltage E2. The microcomputer 21 controls sweep initiation timing and sweep termination timing in response to either of the output (f) of the comparator 20a or the output (b) of the comparator 20b depending upon the sweep cycle.

The second cycle of the double super heterodyne reception mode having smaller sweep width performs only reception confirming process for the X band and the K band (namely, it does not perform in the second cycle of the double super heterodyne reception mode signal to discriminate the Ka band). As can be appreciated from FIG. 2, the objective band for detection in the X band is contained in the front half of the sweeping range, and the objective band for detection in the K band is contained in the rear half of the sweeping range. Based on this fact, the input signal through the antenna can be discriminated between the X band and K band depending upon whether the reception judgement signal occurs at the front half of sweep or at the rear half of the sweep. The microcomputer 21 executes a confirmation process, in which the band discrimination based on the voltage difference ΔE corresponding to the interval of the detection pulse and the band discrimination depending upon the position of the reception judgement signal are combined in order to avoid erroneous detection.

It should be noted that the judgement whether the reception judgement signal occurs at the front half or rear half of the sweep width can be made in the following manner. For instance, as shown in FIG. 5, the output voltage at the occurrence of the reception judgement signal is read and discriminated into two levels E3 and E4 by the microcomputer 21.

In the first cycle of the double super heterodyne reception mode and the signal super heterodyne reception mode having larger sweep width, the microcomputer 21 performs the reception confirmation process only for the Ka band. By performing the reception confirmation process for avoiding erroneous detection in time division manner, the load on the microcomputer can be reduced.

As set forth, in the foregoing embodiment, there is included a control means for switching the sweep width of the first local oscillator 3. It is also possible to switch the frequency of the second local oscillator in the same manner in certain setting of the frequencies at respective part of the system, in the same manner so that reception band can be switched in synchronism with sweep cycle in the double super heterodyne reception mode.

Figure 7:
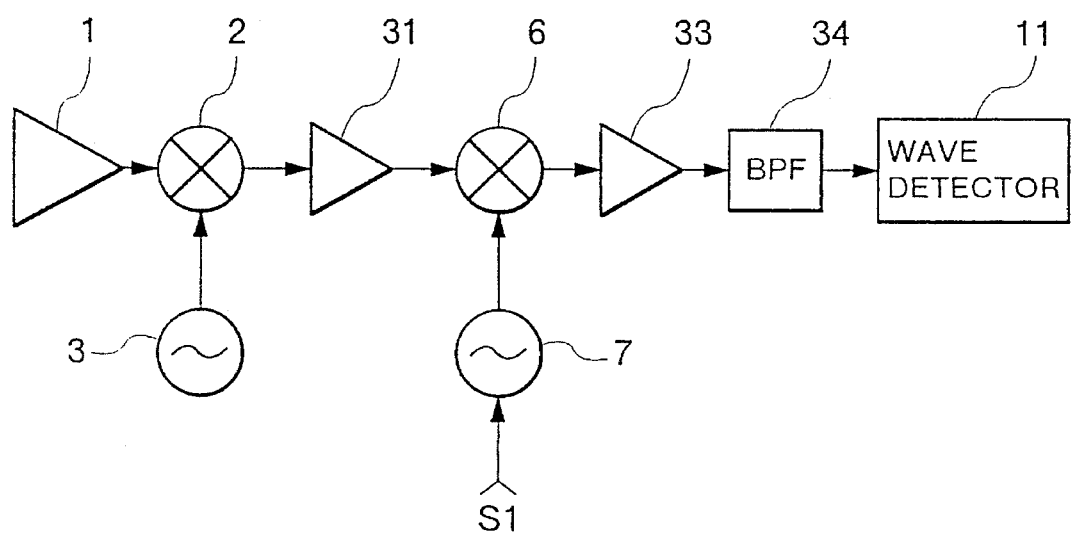
FIG. 7 is a schematic block diagram of the third embodiment of a microwave detector according to the invention.
Figure 8:
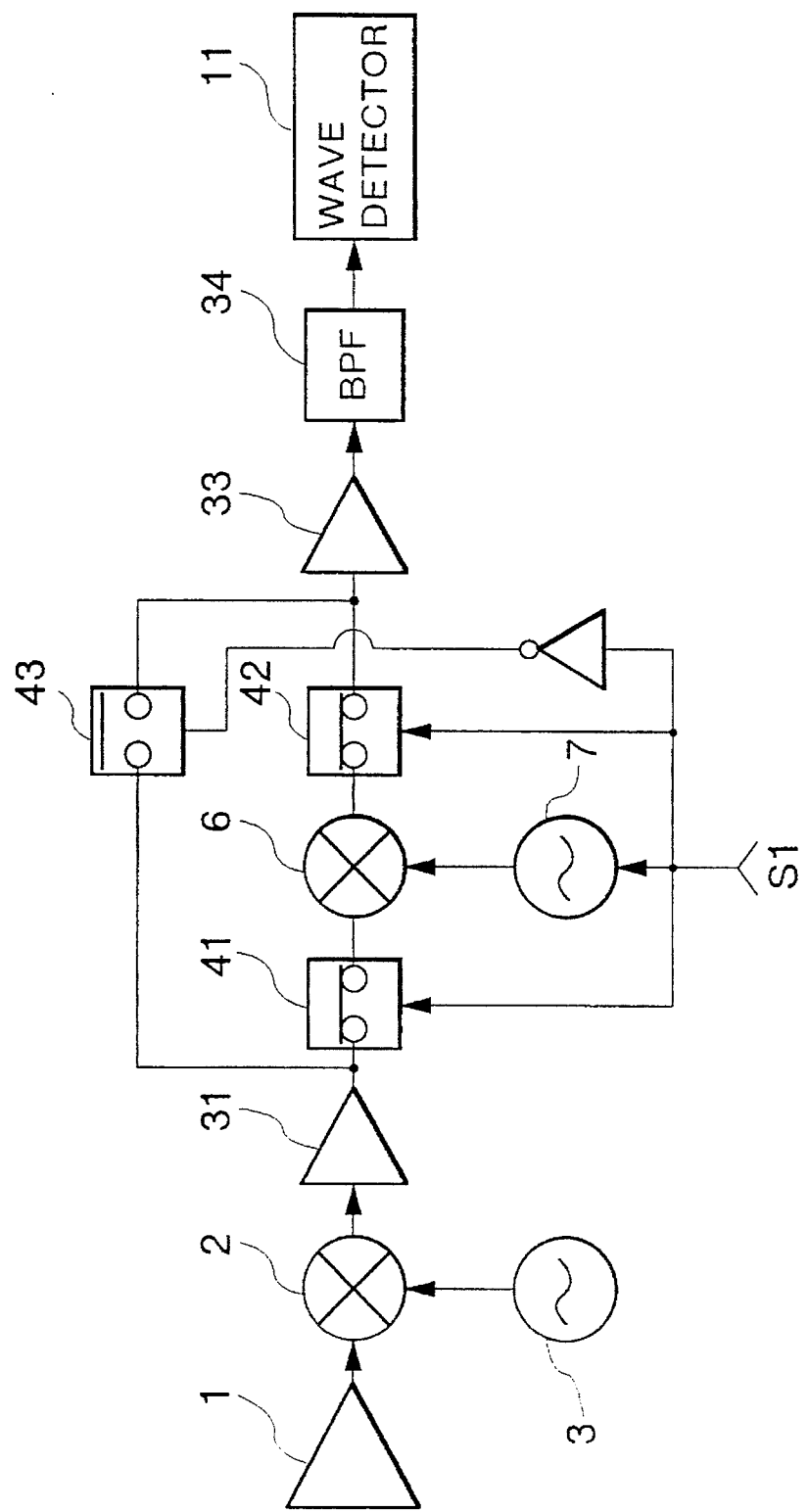
FIG. 8 is a schematic block diagram of the fourth embodiment of a microwave detector according to the invention.
Figure 9:
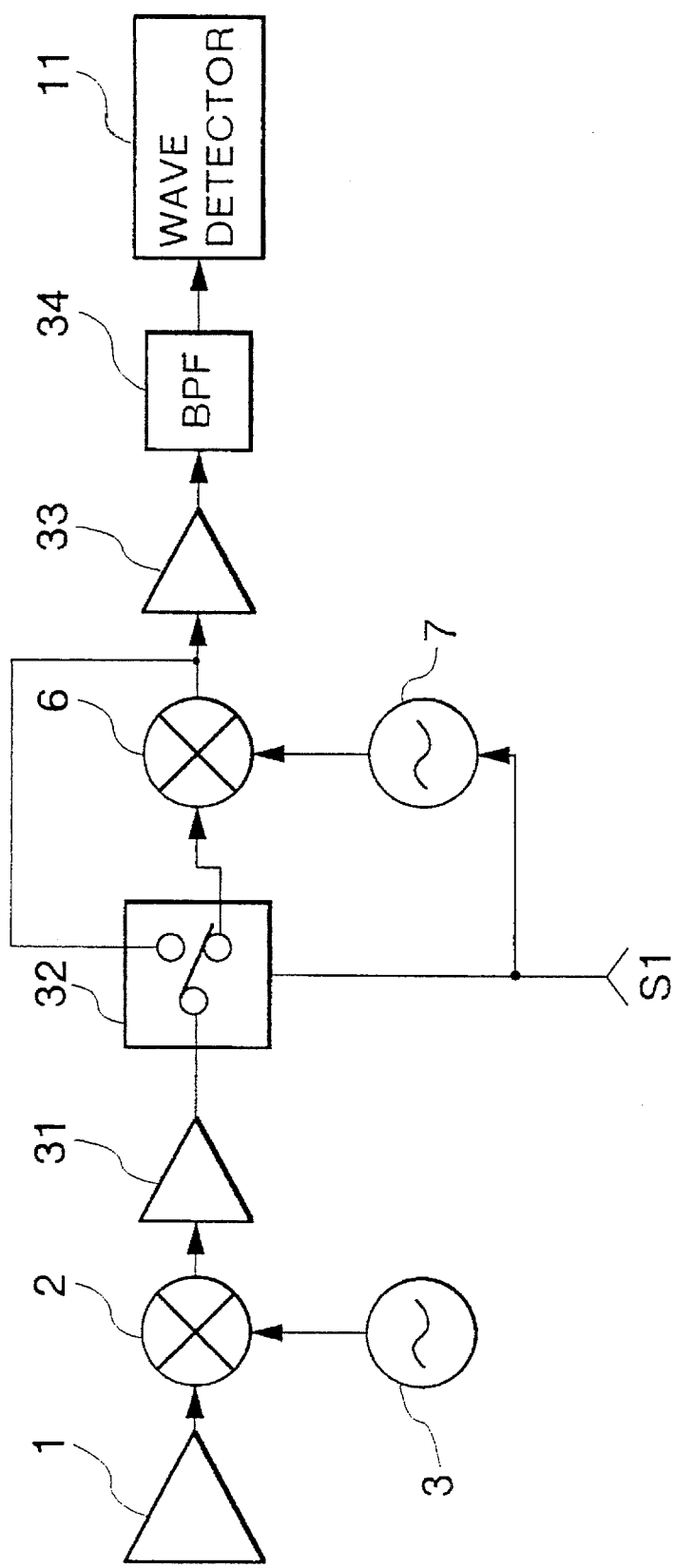
FIG. 9 is a schematic block diagram of the fifth embodiment of a microwave detector according to the invention.

It should be appreciated that switching between the single super heterodyne reception mode, in which the output of the first mixer 2 is input to the wave detector 11 and the double super heterodyne reception mode, in which the output of the second mixer 6 is input to the wave detector 11, can be implemented by various circuit constructions. FIGS. 7, 8 and 9 show examples of the circuit constructions for switching the double super heterodyne reception mode and the single super heterodyne reception mode.

In the example of FIG. 7, an analog switch is not present on a high frequency signal path. In this case, when the second local oscillator 7 terminates operation in response to the mode switching signal S1, the output of the intermediate frequency amplifier 31 simply passes the second mixer 7 and is input to the wave detector 11 via the intermediate frequency amplifier 33 and the band-pass filter 34.

In the example of FIG. 8, an analog switch 41 inserted at the input side of the second mixer 6 and an analog switch 42 inserted at the output side of the second mixer 6 are switched ON and OFF at the same phase and an analog switch 43 inserted in the by-pass path from the intermediate frequency amplifier 31 to the intermediate frequency amplifier 33 is switched ON and OFF at the opposite phase to the analog switches 41 and 42.

In the example of FIG. 9, a switching switch 32 for selectively connecting the output of the intermediate frequency amplifier 31 to the first mixer 6 or the intermediate frequency amplifier 33, is provided.

As set forth above, the wideband microwave detector according to the present invention is constructed with taking the double super heterodyne receiver circuit as a basic circuit construction and is designed to operate as both of the double super heterodyne receiver circuit and the single super heterodyne receiver circuit in time sharing manner with automatic switching therebetween. Therefore, the targeted wide reception band range can be easily covered by combination of the sensitive band in the single super heterodyne reception mode and sensitive band in the double super heterodyne reception mode. Therefore, it becomes possible to provide a quite compact and inexpensive detector which can cover all of the X band, K band and Ka band which are required to be detected for the microwave detector adapted for detection of the traffic monitoring radar type speed measuring equipment.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as being limited to the specific embodiment set out above but to include all possible embodiments which can be embodied within a scope encompassed and equivalents thereof with respect to the features set out in the appended claims.

What is claimed is:

1. A wideband microwave detector comprising:

a first local oscillator outputting a first local oscillation output containing a basic wave component, a secondary high harmonic component and a tertiary high harmonic component and being swept within a predetermined frequency range;

first mixing means for performing frequency mixing of said first local oscillation output and an antenna input input through an antenna and outputting a first mixing output;

a second local oscillator outputting a second local oscillation output;

second mixing means for performing frequency mixing of said first mixing output and said second local oscillation output for generating a second mixing output;

a single frequency discrimination means for detecting a specific frequency in a discrimination input;

and a mode switching means for alternately switching a single super heterodyne reception mode, in which said first mixing output of said first mixing means is fed into said frequency discrimination means as said discrimination input and a double super heterodyne reception mode, in which said second mixing output of said second mixing means is fed into said frequency discrimination means as said discrimination input, in synchronism with sweep operation of said first local oscillator.

2. A wideband microwave detector as set forth in claim 1, which further comprises signal processing means for distinguishing the output of said frequency discrimination means among the discrimination output obtained from a mixing signal of said basic wave component of said first local oscillation output and said antenna input, the discrimination output obtained from a mixing signal of said secondary high harmonic component and said antenna input and the discrimination output obtained from a mixing signal of said tertiary high harmonic component and said antenna input.

3. A wideband microwave detector as set forth in claim 1, which further comprises a switching control means for periodically varying sweep width of said first local oscillator.

4. A wideband microwave detecting system for detecting a specific microwave involved in one of a plurality of mutually distinct predetermined band ranges comprising:

a first local oscillator generating a first local oscillation signal containing a plurality of mutually distinct frequency components including a basic wave component and at least one higher-order high harmonic component, said first oscillator sweeping within a predetermined frequency range;

a first mixer receiving an externally input signal and said first oscillation signal for mixing respective frequency components of said first oscillation signal with said externally input signal and outputting a first mixing signal having a peak at the center of respective of said predetermined band ranges;

a second local oscillator generating a second local oscillation signal;

a second mixer mixing said first mixing signal with said second local oscillation signal and outputting second mixing signal having two peaks in the vicinity of respective extreme frequencies of respective of predetermined band ranges;

signal path cyclically switching signal to pass between said first mixing signal and said second mixing signal;

a wave detector connected to said signal path to receive one of said first mixing signal and said second mixing signal as a detector input signal passing therethrough and detecting a predetermined specific frequency for generating a detecting pulse upon detection of said predetermined specific frequency in the detector input signal, and said predetermined frequency being set at a value so that said detector input signal varies across said predetermined specific frequency before and after reaching the peak; and discriminator receiving said detecting pulses and discriminating the band range of the externally input signal on the basis of an interval between said detecting pulses generated before and after the peak of said detector input signal.

5. A system as set forth in claim 4, which further comprises means for converting the period of said interval of said detecting pulses into a voltage.

6. A system as set forth in claim 4, which further comprises a periodic switch periodically switched between a first position for passing said first mixing signal through said signal path and a second position for passing said second mixing signal through said signal path.

7. A system as set forth in claim 6, which further comprises a saw-tooth signal generator generating a saw-tooth signal having a saw-tooth wave period corresponding to the switching cycle of periodic switch.

8. A system as set forth in claim 7, which further comprises means for converting the period of said interval of said detecting pulses into a voltage on the basis of the voltage level difference of said saw-tooth signal at the occurrence of a leading detecting pulse generated upon detection of said predetermined specific frequency before said detector input signal reaches the peak and at the occurrence of a trailing detecting pulse generated upon detection of said predetermined specific frequency after said detector input signal reaches the peak.

9. A wideband microwave detecting system for detecting a specific microwave involved in one of X band, K band and Ka band comprising:

a first local oscillator generating a first local oscillation signal containing a plurality of mutually distinct frequency components including a basic wave component and at least one higher-order high harmonic component, said first oscillator sweeping within a predetermined frequency range;

a first mixer receiving an externally input signal and said first oscillation signal for mixing respective frequency components of said first oscillation signal with said externally input signal and outputting a first mixing signal having a peak at the center of respective of said predetermined band ranges;

a second local oscillator generating a second local oscillation signal;

a second mixer mixing said first mixing signal with said second local oscillation signal and outputting second mixing signal having two peaks in the vicinity of respective extreme frequencies of respective of predetermined band ranges;

signal path switching signal to pass between said first mixing signal and said second mixing signal according to a predetermined switching schedule;

a wave detector connected to said signal path to receive one of said first mixing signal and said second mixing signal as a detector input signal passing therethrough and detecting a predetermined specific frequency for generating a detecting pulse upon detection of said predetermined specific frequency in the detector input signal, and said predetermined frequency being set at a value so that said detector input signal varies across said predetermined specific frequency before and after reaching the peak; and discriminator receiving said detecting pulses and discriminating the band range of the externally input signal on the basis of an interval between said detecting pulses generated before and after the peak of said detector input signal.

10. A system as set forth in claim 9, which further comprises means for converting the period of said interval of said detecting pulses into a voltage.

11. A system as set forth in claim 9, which further comprises a periodic switch periodically switched between a first position for passing said first mixing signal through said signal path and a second position for passing said second mixing signal through said signal path.

12. A system as set forth in claim 11, which further comprises a saw-tooth signal generator generating a saw-tooth signal having a saw-tooth wave period corresponding to the switching cycle of periodic switch.

13. A system as set forth in claim 12, which further comprises means for converting the period of said interval of said detecting pulses into a voltage on the basis of the voltage level difference of said saw-tooth signal at the occurrence of a leading detecting pulse generated upon detection of said predetermined specific frequency before said detector input signal reaches the peak and at the occurrence of a trailing detecting pulse generated upon detection of said predetermined specific frequency after said detector input signal reaches the peak.

14. A system as set forth in claim 9, which is operable in mutually distinct first, second and third modes, in said first mode, said first local oscillator is set a sweeping frequency range at a predetermined wider range, said signal path passes said second mixing signal, and said wave detector is adapted to detect said predetermined specific frequency in the vicinity of one of extremes of said Ka band;

in said second mode, said first local oscillator is set the sweeping frequency range at a predetermined narrower range, said signal path passes said second mixing signal, and said wave detector is adapted to detect said predetermined specific frequency in the vicinity of one of extremes of said X and K bands; and in said third mode, said first local oscillator is set the sweeping frequency range at said predetermined wider range, said signal path passes said first mixing signal and said wave detector is adapted to detect said predetermined specific frequency in the vicinity of center frequency of said Ka band.

* * * * *